Sept. 3, 1968  J. C. FOLINSBEE  3,399,734
MOBILE ROCK DRILL CARRIAGE
Filed June 6, 1966  5 Sheets-Sheet 1

INVENTOR.
JOHN C. FOLINSBEE
BY *Frank J. Piper*

Agent

Sept. 3, 1968

J. C. FOLINSBEE 3,399,734

MOBILE ROCK DRILL CARRIAGE

Filed June 6, 1966

INVENTOR.
JOHN C. FOLINSBEE

BY

Agent

Sept. 3, 1968    J. C. FOLINSBEE    3,399,734
MOBILE ROCK DRILL CARRIAGE
Filed June 6, 1966    5 Sheets-Sheet 4
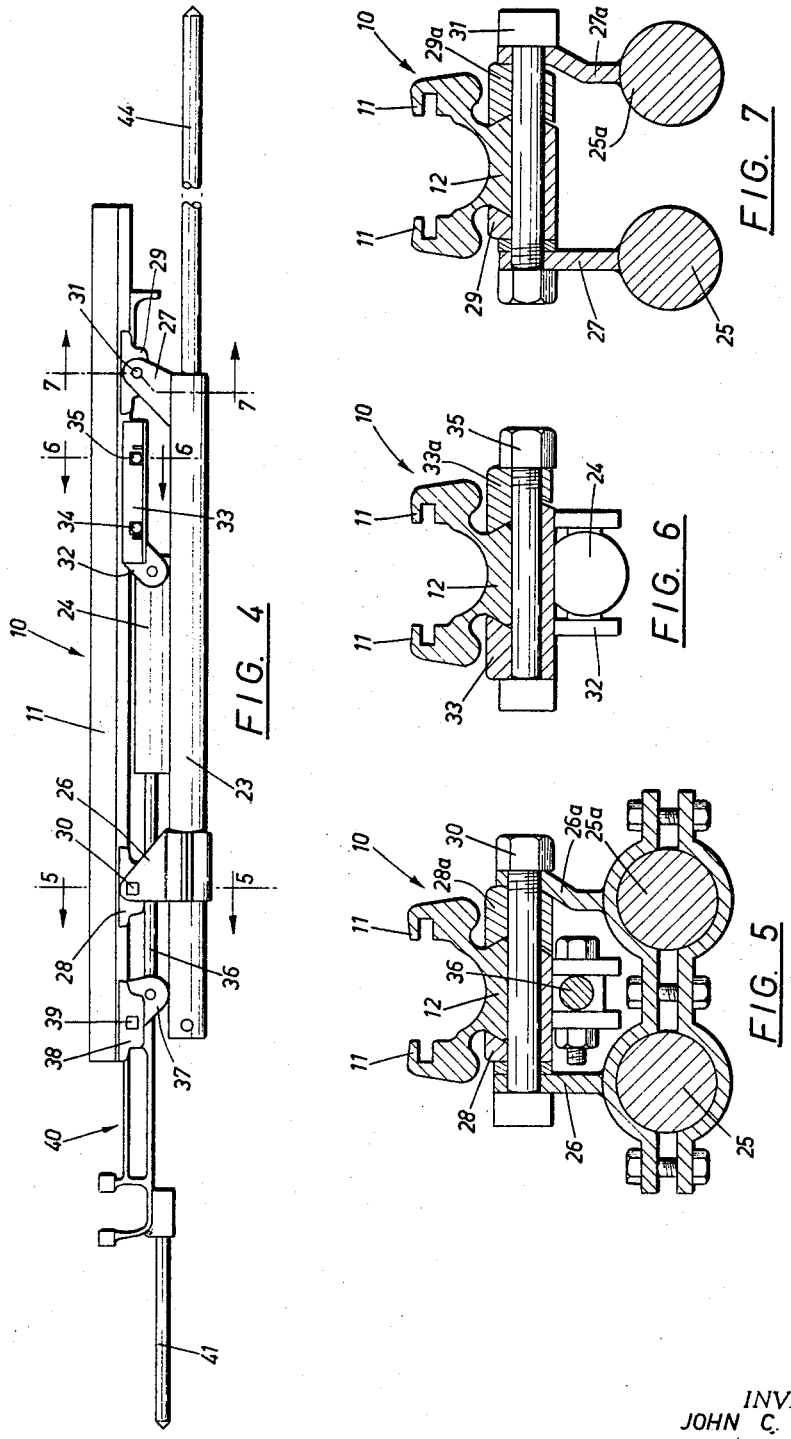
INVENTOR.
JOHN C. FOLINSBEE
BY
Agent Sept. 3, 1968  J. C. FOLINSBEE  3,399,734
MOBILE ROCK DRILL CARRIAGE
Filed June 6, 1966  5 Sheets-Sheet 5
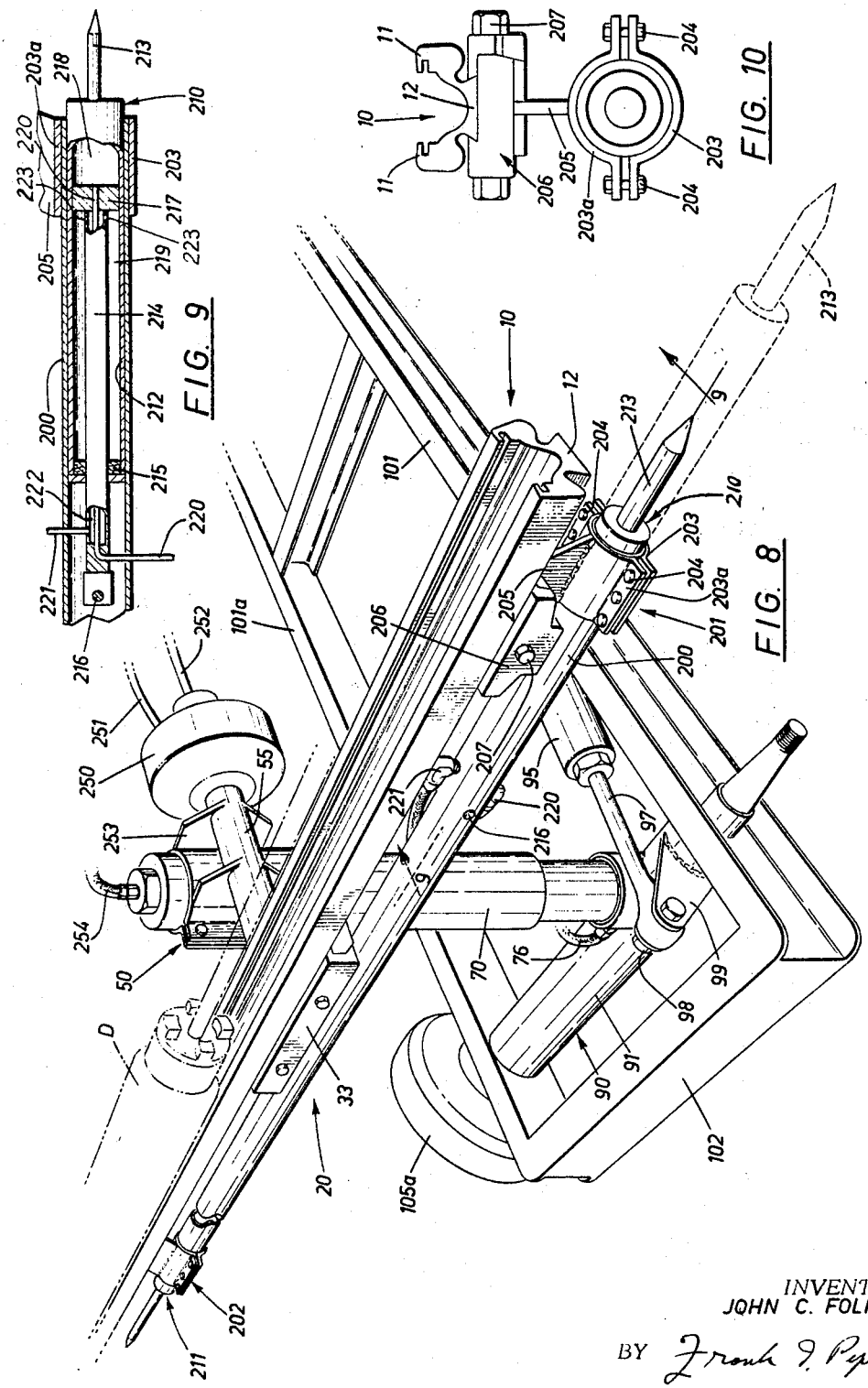
INVENTOR.
JOHN C. FOLINSBEE
BY Frank I. Pipu
Agent

United States Patent Office 3,399,734
Patented Sept. 3, 1968

3,399,734
MOBILE ROCK DRILL CARRIAGE
John C. Folinsbee, Lynn Lake, Manitoba, Canada, assignor to Sherritt Gordon Mines Limited, Toronto, Ontario, Canada, a company of Canada
Filed June 6, 1966, Ser. No. 555,357
10 Claims. (Cl. 173—34)

ABSTRACT OF THE DISCLOSURE

A drill carriage having an elongated drill guide on which a percussion drill is mounted, a mast and a vehicle. The mast is telescopic and composed of two parts, one rotatable relative to the other. One of the parts is pivotally connected to the drill guide and the other part pivotally connected to the vehicle. Thus the drill guide may be positioned in a variety of elevations and directions. Means at both ends of the drill guide extend to engage the rock face in order to stabilize the drill guide during drilling.

---

This invention is directed to rock drilling equipment and, in particular, is directed to a mobile rock drill support apparatus generally referred to in the art as a "jumbo."

In underground rock drilling it is well known to provide a percussion drill support means having extensible members extending therefrom to engage adjacent rock surfaces to support and steady the drill in its operating position. These prior arrangements have been characterized by bulkiness and undue complexity, and generally they do not provide sufficient support to percussion drills to prevent undue vibration and movement of the drill during operation.

Mobile, wheeled drill support rigs are also known but are noted for their complex structure, high profile when in the travelling position, and limited usefulness due to the restricted mode of use.

An object of the present invention is to provide an improved drill jumbo suitable for ready movement through underground workings. Another object is to provide a drill jumbo with improved flexibility of operation which enables easy selective positioning of a drill at a desired height, horizontal angle and angle of inclination with respect to the rock face to be drilled.

A further object of the present invention is to provide a mobile drill support jumbo providing multi-position, stable drill support between rock faces independent of the jumbo transport means.

The present invention achieves these and other objects by providing a mobile drill carriage for use in rock drilling comprising: elongated drill guide means; extensible support means attached to the drill guide means and adapted to extend beyond the ends thereof to steady the guide when in extended engagement against adjacent rock faces; extensible mast means pivotally mounted adjacent one end thereof for movement about a normally horizontal axis, said mast means having first hydraulic actuator means to provide extension of the length thereof and second hydraulic actuator means connecting said mast with a mobile support frame to position the mast at a desired angular position relative to the frame; and arm means connected intermediate the ends of the drill guide and pivotally connecting said guide with the extensible mast for pivotal movement in a plane parallel thereto whereby the drill guide may be selectively positioned at a desired height, horizontal angle and inclination relative to a rock face to be drilled.

The invention is described with reference to the following drawings which illustrate embodiments of the invention wherein:

FIGURE 4 shows details of the drill guide support arrangement of FIGURE 1;

FIGURES 5, 6 and 7 are sectional views taken along the lines 5—5, 6—6 and 7—7, respectively, in FIGURE 4;

FIGURE 8 is a general perspective view, with some parts removed, illustrating another embodiment of the invention;

FIGURE 9 is a sectional view along the line 9—9 in FIGURE 8; and

FIGURE 10 is an end elevation showing the guide shell and actuator of FIGURE 8.

Figure 1:
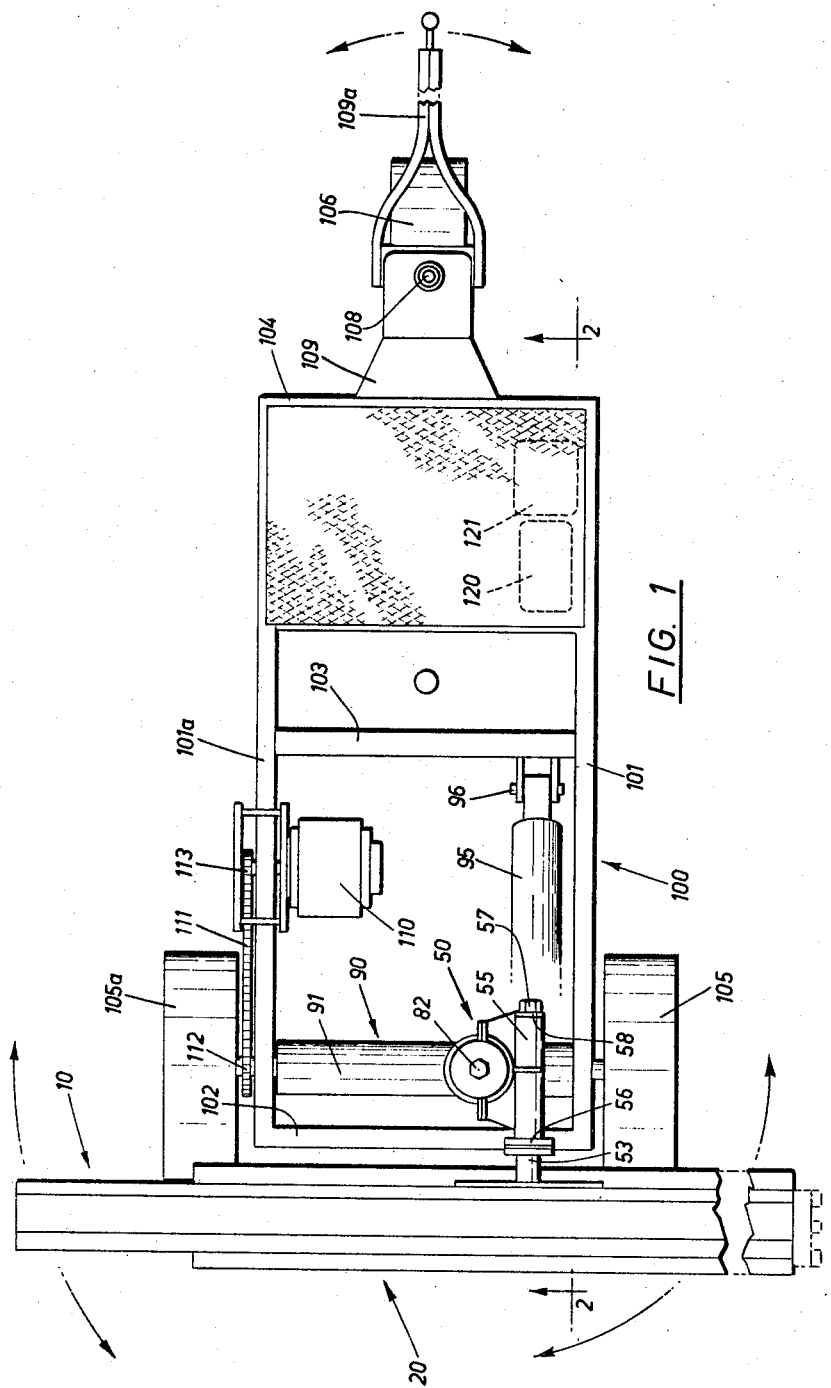
FIGURE 1 is a plan view of one embodiment of the invention showing the jumbo.
Figure 2:
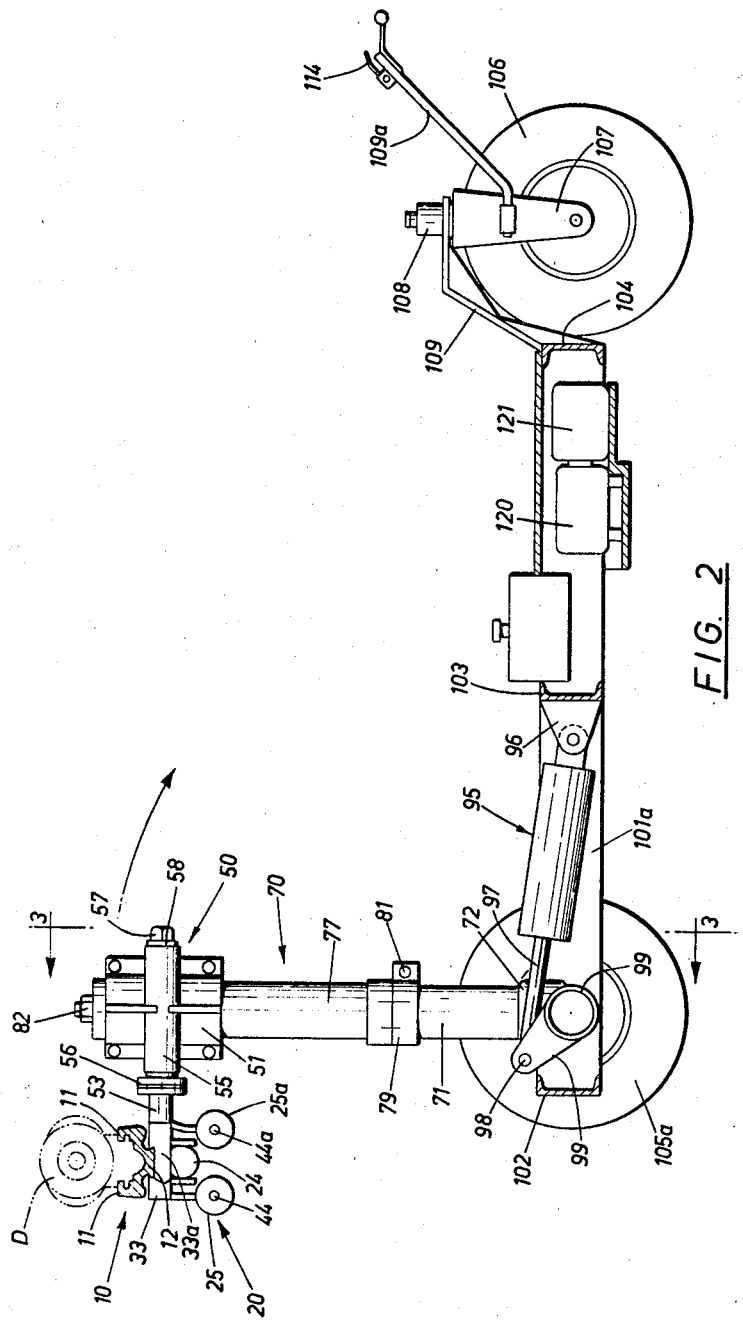
FIGURE 2 is a partial side elevation taken along the line 2—2 of the arrangement shown in FIGURE 1.
Figure 3:
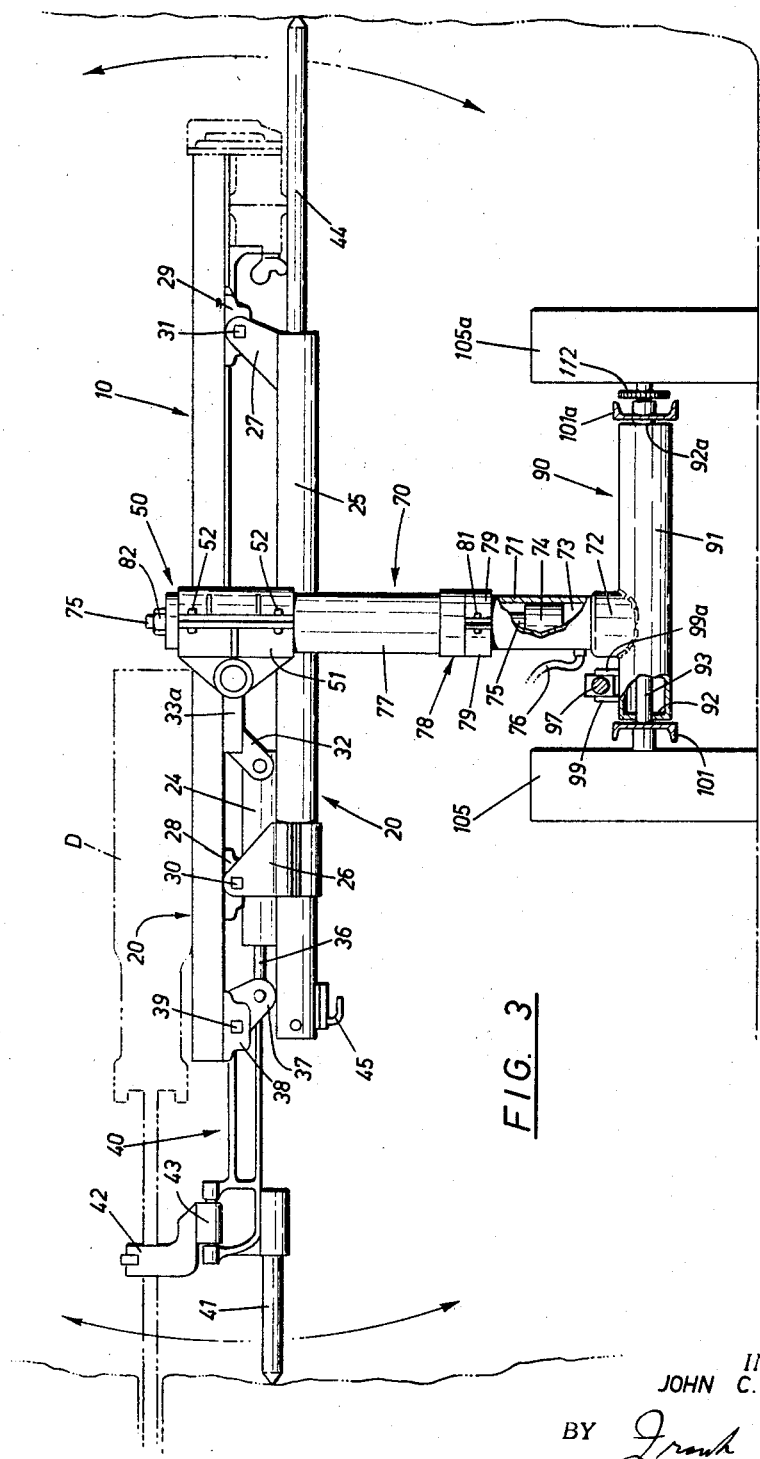
FIGURE 3 is a partial front elevation, with portions broken away, taken along the line 3—3 in FIGURE 2 and showing the jumbo in a drift with the drill guide supported in a horizontal drilling position.

Referring to FIGURES 1–7 of the drawings and, in particular, to FIGURES 1, 2 and 3, the drill support carriage comprises a drill guide shell 10 adapted to receive a percussion drill D and rotatably mounted by means of swivel assembly 50 on an extensible mast 70 for pivotal movement in a plane parallel to the longitudinal axis of the mast. A drill guide shell stabilizing means 20 is mounted below the guide shell 10.

The mast 70 is mounted on a transverse mast support axle 90 which is pivotally supported by carriage frame 100. Frame 100 is mounted on wheels 105, 105a and 106. Mounted on the frame 100 are motor means 110 to provide tractive power to the driven wheels 105, 105a and a second motor means 120 in driving relation with a hydraulic pump 121 to provide pressurized hydraulic fluid for operation of the various hydraulic actuators as described in detail hereinbelow.

Referring particularly to FIGURES 2 through 7, the drill guide shell 10 comprises a channel of generally U-section having upstanding grooved side walls 11 in combination with an outwardly bevelled lower portion 12. The grooved upwardly extending side walls 11 are adapted to receive the percussion drill D in sliding relation therewith, and the lower portion 12 of the section provides means for securing the shell stabilizing means 20 thereto.

Stabilizing means 20 includes a forward positioning actuator 24 and a pair of twin rearward positioning actuators 25, 25a. Drill guide positioning actuators 25, 25a are adjustably secured to the lower portion 12 of the guide shell 10 by means of actuator brackets 26, 27 and 26a, 27a and split clamps comprised of gripping elements 28, 28a and 29, 29a which are provided with securing nut and bolt assemblies 30, 31. Forward actuator 24 is adjustably secured at its rear end to lower portion 12 of guide shell 10 by means of bracket 32, attached to split clamp 33, 33a which is releasably secured to guide shell portion 12 by nut and bolt assemblies 34, 35.

Forward actuator 24 has a piston rod 36 connected to a bracket 37 secured to a centralizer clamp 38. Clamp 38 is releasably secured to section 12 by means of nut and bolt assembly 39. A drill rod centralizer 40 is attached at clamp 38 and projects forwardly of the end of guide 10. A forward rock contact member 41, which may be of any suitable pre-selected length, is removably secured to the lower side of the centralizer 40 by conventional clamping means (not shown). With clamp 38 loosened, rock contact 41 can be extended to the rock face by the forward movement of piston rod 36. It is then clamped in position by tightening nut and bolt assembly 39.

As illustrated in FIGURE 3, the percussion drill D is mounted in drill guide 20 with the drill portion protruding therebeyond through drill rod centralizer steady member 42 which is pivotally mounted on rod centralizer 40 as shown at 43.

The twin rearward positioning actuators 25, 25a, have twin extension rods 44, 44a adapted to forcefully engage a rock face opposite the forward rock contact member 41 to firmly hold the shell 10 and drill D in working position as shown in FIGURE 3. Hydraulic control valves 45 (FIGURE 3) mounted at the forward end of actuators 25, 25a provide control for the pressurized extension of the three positioning actuators 24, 25, 25a. Stabilization of the drill guide 10 by the actuators reduces vibration in the drill support assembly thereby improving drill penetration rate.

The drill shell 10 with the percussion drill mounted thereon is attached to the mast 70 by means of a swivel mounting assembly 50. The mounting assembly 50 includes a mast attachment portion 51 in the form of a split sleeve having nut and bolt means 52 for releasably clamping it to the mast 70 at any desired angular disposition with respect to the carriage frame 100. A drill guide support arm 53 is butt welded to clamp portion 33a releasably secured to guide shell lower portion 12. Arm 53 is rotatably mounted in a hollow pivot boss 55 fixed to the mast attachment portion 51. The arm 53 is formed with flange member 56 and a cylindrical portion with a threaded end extending therefrom through the pivot boss 55 such that a nut 57 can be threadably attached. A washer 58 provides a bearing surface for the face of the nut 57. It will be seen that by slackening the nut 57, the guide 10 and its attachments are free for pivotal movement about an axis normal to the axis of mast 70, and when the nut 57 is securely tightened, the guide 10 is held at the desired inclined or level position.

The mast 70 to which the mast swivel attachment 50 is secured comprises a tubular lower portion 71 mounted in a support bracket 72 secured to mast support axle 90. Referring particularly to FIGURE 3, the lower portion 71 of mast 70 comprises an inner chamber 73 containing a piston 74 from which extends a connecting rod portion 75 which provides extension of the mast. A flexible fluid supply pipe 76 provides hydraulic fluid to the chamber 73 beneath the piston 74 in order to provide extension of the mast. The upper portion of chamber 73 above piston 74 is vented by way of an air vent (not shown) extending through the centre of the connecting rod portion 75 and communicating with the upper chamber space. A tubular upper mast portion 77 is mounted in telescoping relation with the lower portion 71 such that the upper mast portion 77 may be rotated with respect to the lower portion 71. A securing collar 78 with split halves 79 which are adapted to be clamped in securing relation to the lower mast portion 71 by tightening nut and bolt assembly 81. The upper portion of mast 70 is secured to the connecting rod 75 by way of a nut 82. The connecting rod 75 is centred within the mast's lower portion 71, at the upper end thereof by way of an internal centering journal (not shown).

The mast 70 is secured to the mast support axle assembly 90 by means of the mast support bracket 72. The support axle assembly 90 includes a main tube member 91 having end journal portions 92, 92a through which journal pin 93 extends in supporting relation with the side members 101, 101a of frame 100 of the carrier.

The frame 100 of the rig comprises side members 101, 101a and cross members 102, 103 and 104. A pair of front wheels 105, 105a are rotatably mounted on frame side members 101, 101a and a steerable rear wheel 106 is attached to cross member 104. The steerable wheel 106 is carried by a pair of forks 107 which are supported by a vertical pivot 108 journalled in frame extension member 109. A steering handle 109a is attached to the forks 107.

Angular rotation of the mast support axle 90 about the journal pin 93 is effected by a mast positioning actuator 95. Actuator 95 is pivotally attached at one end to a bracket 96 secured to frame cross-member 103 and has an extensible piston rod 97 connected to a crank pin 98 mounted in a pair of crank webs 99, 99a fixed to axle member 91.

A rig propulsion motor 110, which may be an air or an electric motor, drives one of the front wheels of the rig by way of a chain 111 in conjunction with sprockets 112, 113. A control valve 114 for operating the propulsion motor 110 is conveniently mounted on the steering handle 106.

The rig also carries a prime mover or other suitable motor 120, either electrical or air, in a driving connection with a hydraulic pump 121 to provide pressurized fluid for the operation of the hydraulic actuators utilized for the mast raising and the guide steadying functions of the apparatus.

In the embodiment of the invention illustrated in FIGURES 8-10, the guide shell stabilizing means 20 consists of a single elongated tubular member 200 adjustably secured to the lower portion 12 of drill guide shell 10 by means of a forward mounting assembly 201 and a similar rearward mounting assembly 202. Each of the mounting assemblies has a split collar comprised of portions 203, 203a adapted to be releasably clamped on tubular member 200 by means of nut and bolt assemblies 204. A web portion 205 is welded on one side to collar portion 203a and on the other side to clamp member 206. Clamp member 206 and cooperating member 206a is releasably secured to lower portion 12 of guide shell 10 by means of nut and bolt assemblies 207. A similar clamp secures the rearward actuator mounting assembly 202 to shell 10.

Forward stabilizing actuator 210, and a similar rearward stabilizing actuator 211, are positioned in tubular member 200. Actuators 210 and 211 are constructed in the same manner and, as shown particularly in FIGURE 9, include a cylindrical piston 212 adapted for slidable movement within tubular member 200. Piston 212 is closed at the outer end and has rock contact member 213 attached thereto. A cylinder rod 214 is positioned concentrically within tube 200 and extends into piston 212 through an opening in the inward-facing end wall thereof. Packing 215 is provided at the end wall opening to provide a fluid-tight seal. Rod 214 is secured at its inner end to tube 200 by means of transverse pin 216 and at its opposite extremity has cap 217 which is adapted to permit sliding, fluid-sealed movement of piston 212 thereover. Cap 217 divides piston 212 into two chambers 218 and 219. Chamber 218 communicates with a hydraulic pressure source through conduit 220 passing through rod 214 and cap 217. Chamber 219 is connected with a hydraulic pressure source through conduit 221 which communicates with annular conduit 222 which, in turn, opens into chamber 219 as shown at 223.

A further modification in the embodiment of FIGURES 8-10 is the utilization of a rotary hydraulic actuator 250 for pivoting the guide shell 10 in a plane parallel to the axis of mast 70. Actuator 250 with fluid inlet and outlet lines 251, 252 is mounted on swivel assembly 50 by means of motor mounting bracket 253 and has its output shaft coupled directly to the drill guide support arm 53 (not shown in FIGURE 8). Still another variation in this embodiment is the utilization of a two-way hydraulic actuator within mast 70 for raising and lowering the drilling assembly. A second hydraulic line 254 is thus connected at the top of mast 70.

When the drill is in the operating position, as illustrated particularly in FIGURE 3, it will be readily apparent that the drill guide shell 10 can be secured in the desired drilling position to provide a stable platform and, at the same time, avoid the transmission of reaction forces of any magnitude to the support mast of the vehicle.

The drill guide is moved from the operative position illustrated to the travelling position by the following series of steps: With the percussion drill and the stabilizing actuators withdrawn from the rock faces, the mast securing collar 78 is released by slackening nut and bolt 81 securing the split halves 79 thereof. The guide and its attachments can then be swung into longitudinal alignment with side members 101, 101a of the carrier frame by pivoting about the mast axis; and the mast can be lowered by depressurizing the lower inner chamber 73 to lower the mast at its reduced height, these two actions being carried in any desired sequence. The mast 70, together with the percussion drill and the guide shell 10, can then be tilted rearwardly and downwardly to a rest position on top of the deck of the carrier by operating the actuator 95 in a withdrawal mode. At the same time, the nut 57 of the pivotal mounting arm 53 is loosened to maintain the shell 10 in a substantially horizontal position while the mast is lowered to rest position on the carrier.

It will be seen that the mast 70 is offset in relation to the centre line of the mast support axle 90 thereby providing a suitable packing space to accommodate the guide and drill when in the retracted position.

In a characteristic jumbo, the overall height in the collapsed position is 36 inches. With the mast in the upright position a drill height of 68 inches is obtainable, including 20 inches of vertical travel obtainable with full extension of the mast. The length of the stabilizing assembly in the retracted position is about 6½ feet and in the extended position, about 11½ feet.

It will be appreciated that the rig described in the foregoing disclosure is capable of substantially unlimited movement while being, at the same time, very stable both in the travelling position and in the operating position while the simplicity of controls provides improved drill utilization time and reduces the man-handling required by the operators. Actual operating experience has shown that drill steel maintenance can be reduced by 40% or more by use of the stable drill support of this invention.

It is to be understood that the form of the invention herein shown and described is to be taken as a preferred example of the same, and that various changes in the shape, size and arrangement of the parts may be resorted to without departing from the spirit of the invention or the scope of the appended claims.

What I claim as new and desire to protect by Letters Patent of the United States is:

1. A mobile device for use in rock drilling comprising: elongated drill guide means having a percussion drill mounted thereon; extensible drill guide stabilizing means mounted on said guide to extend forwardly and rearwardly beyond the ends thereof to steady the guide means when in extended engagement against adjacent rock faces; extensible drill guide support mast means comprised of upper and lower telescoping portions, said lower portion pivotally mounted adjacent one end thereof on a mobile support frame for movement about an axis normal to said mast axis; a sleeve positioned about the upper portion of said support mast, said sleeve being rotatable about the longitudinal axis of said support mast; means for releasably clamping said sleeve to the upper portion of said support mast to prevent undesired rotation of said sleeve about the longitudinal axis of said support mast; first hydraulic actuator means to provide extension of the length of said support mast; second hydraulic actuator means connecting said support mast with the mobile support frame to position said mast at a desired angular position relative to the frame; and swivel means intermediate the ends of said drill guide means pivotally connecting the guide means with the sleeve for parallel pivotal movement relative thereto whereby said drill guide may be selectively positioned and stabilized at a desired working horizontal attitude relative to rock face to be drilled.

2. A device as claimed in claim 1 wherein said extensible stabilizing means comprises oppositely extending hydraulic actuators adjustably mounted on the underside of the guide means and having wall contacting members extendable therefrom beyond the outer ends of said guide means whereby the guide means may be positively stabilized between opposed rock surfaces of a drift by extension of said wall contacting members thereagainst.

3. A device as claimed in claim 1 wherein said extensible stabilizing means comprises a pair of oppositely extending hydraulic actuators mounted in axial alignment beneath said guide means and having extensible piston members operable by fluid pressure; rock contact members fixed to the outer ends of said piston members adapted to project beyond the ends of said guide means to firmly engage opposite rock faces of an excavation thereby stabilizing said guide means in a desired working position.

4. A device as claimed in claim 1 wherein the forwardly extending wall contacting member is provided with clamping means for releasably securing it in an extended position.

5. A device as claimed in claim 1 wherein said sleeve is split and a drill guide shell support arm is rotatably mounted on said split sleeve such that its axis of rotation is normal to the longitudinal axis of said mast whereby said drill guide may be pivoted in a plane parallel to said mast to a selected angular position for drilling.

6. A device as claimed in claim 1 wherein said support mast is movable by means of said second hydraulic actuator from a substantially vertical working position to a substantially horizontal parked position facilitating ready movement of said rig in low clearance openings.

7. A device as claimed in claim 1 wherein the upper portion of said support mast is provided with means for releasably clamping it to said lower mast portion whereby the drill guide can be positioned and secured at any desired horizontal angle relative to a rock face to be drilled.

8. A device as claimed in claim 1 wherein a rotary hydraulic actuator is mounted on said swivel means, said actuator having a power out-put shaft coupled with said drill guide such that rotation of said shaft pivots said guide in a plane parallel to the longitudinal axis of said mast.

9. A device as claimed in claim 1 wherein the drill guide stabilizing means comprises a first extensible guide stabilizer actuator movably mounted adjacent the drill end of the guide, said actuator having a rock face contact member extending therebeyond in substantially parallel relation with the rock drill; a pair of extensible guide stabilizing actuators slidably mounted on said guide and extending from the end opposite said drill, each actuator having an extensible rock face contacting portion movable axially beyond the end of the guide; a prime mover mounted on said frame in driving connection with a hydraulic pump means, and means connecting said pump means with each of the actuators mounted on said rig whereby said actuators may be selectively extended in rock face engaging relation to steady the boom independently of the mast.

10. A mobile self-propelling rig for use in rock drilling, comprising frame means having transport wheels rotatably mounted thereon, and power means to drive at least one of said wheels; a drill guide shell support mast pivotally mounted at one end on said frame means, and including rotatable upper mast portion, a lower mast portion and locking means to lock the upper portion to the lower portion; an extensible hydraulic actuator connecting said mast upper and lower portions; crank means connected to said mast adjacent the lower end thereof, and an extensible hydraulic actuator having one end thereof pivotally connected to said frame and the other end thereof pivotally connected to said crank means whereby said mast may be angularly displaced with respect to said frame; an elongated drill guide shell mounted for pivotal movement on said upper mast portion in a plane parallel to the axis of rotation of said mast portion, said guide shell adapted to slidably receive a percussion rock drill;

a first guide shell stabilizer actuator mounted adjacent the drill end of the guide in substantially parallel relation with the drill guide shell; a second guide shell stabilizer actuator mounted on said guide in axial alignment with said first stabilizer actuator, each stabilizer actuator having an extensible rock face contacting portion movable axially beyond the end of the guide shell; a prime mover mounted on said frame in driving connection with a hydrauic pump means, and means connecting said pump means with each of the actuators mounted on said rig whereby said mast may be selectively raised and lowered and said rock face contact portions may be selectively extended in rock face engaging relation to stabilize the guide shell independently of the mast.

References Cited

UNITED STATES PATENTS

| | | | |
|---|---|---|---|
| 2,586,773 | 2/1952 | Ball | 248—13 X |
| 2,842,340 | 7/1958 | Burress | 173—27 |
| 2,886,290 | 5/1959 | Brennen et al. | 173—34 |
| 2,979,320 | 4/1961 | Adams | 173—34 X |
| 3,218,893 | 11/1965 | Madison et al. | 173—38 X |

ERNEST R. PURSER, *Primary Examiner.*